US008066846B2

United States Patent
Parén et al.

(10) Patent No.: US 8,066,846 B2
(45) Date of Patent: *Nov. 29, 2011

(54) COMPOSITION AND PROCESS FOR THE TREATMENT OF FIBRE MATERIAL

(75) Inventors: Aarto Parén, Kuusankoski (FI); Jukka Jäkärä, Siivikkala (FI); Jukka Rautiainen, Espoo (FI); Reijo Aksela, Espoo (FI); Ilkka Renvall, Espoo (FI); Anna Ilomäki, Espoo (FI); Minna Sankari, Leverkusen (DE); Anna Sundquist, Helsinki (FI); Heli Virkki, Helsinki (FI); Hannu Hämäläinen, Vaasa (FI)

(73) Assignee: Kemira Oyj, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/523,381

(22) PCT Filed: Jan. 31, 2008

(86) PCT No.: PCT/FI2008/000018
§ 371 (c)(1),
(2), (4) Date: Jan. 19, 2010

(87) PCT Pub. No.: WO2008/092988
PCT Pub. Date: Aug. 7, 2008

(65) Prior Publication Data
US 2010/0139875 A1    Jun. 10, 2010

(30) Foreign Application Priority Data

Feb. 2, 2007   (FI) .................................. 20070096

(51) Int. Cl.
   *D21C 3/20*   (2006.01)
(52) U.S. Cl. ............... 162/76; 162/5; 162/78; 210/696; 210/700; 252/180; 525/206
(58) Field of Classification Search ............... 162/5, 76, 162/78; 210/689, 700; 252/180; 525/206
See application file for complete search history.

(56) References Cited

U.S. PATENT DOCUMENTS

| | | | | |
|---|---|---|---|---|
| 5,135,677 A * | 8/1992 | Yamaguchi et al. | ........... | 252/180 |
| 6,780,832 B1 * | 8/2004 | Maeda et al. | ........... | 510/477 |
| 2008/0035287 A1 * | 2/2008 | Lee et al. | ........... | 162/72 |

FOREIGN PATENT DOCUMENTS

| | | |
|---|---|---|
| EP | 0814193 B1 | 10/2003 |
| WO | 2004063276 A1 | 7/2004 |
| WO | 2004063461 A1 | 7/2004 |
| WO | 2005080673 A2 | 9/2005 |
| WO | WO 2005080673 A2 * | 9/2005 |
| WO | 2005108673 A1 | 11/2005 |

OTHER PUBLICATIONS

JP1266295A; Oct. 24, 1989; Abstract Only (1 page).
JP1148890A; Jun. 12, 1989; Abstract Only (1 page).
Presley, J.R, and Hill, R.T., Section V, Section V: The Technology of Mechanical Pulp Bleaching; Chapter 1: Peroxide Bleaching of (Chemi)mechanical Pulps in Pulp Bleaching—Principle and Practice, Dence, W.C. and Reeve, D.W. Tappi Press, Atlanta, Georgia, the USA, p. 463.

* cited by examiner

*Primary Examiner* — Matthew Daniels
*Assistant Examiner* — Jacob Thomas Minskey
(74) *Attorney, Agent, or Firm* — Thomas, Kayden, Horstemeyer & Risley, LLP

(57) ABSTRACT

The invention relates to a stabilizing composition comprising following components
(A) a polymer having the following formula:

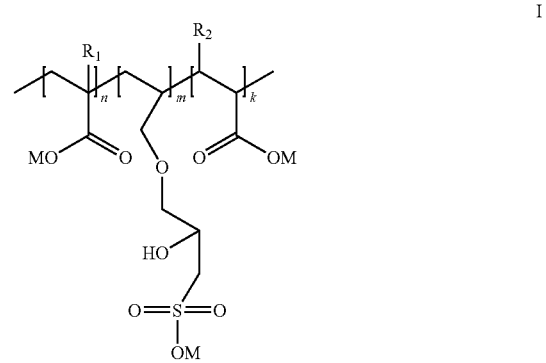

wherein
$R_1$ is a hydrogen atom or an alkyl group containing 1 to 12 carbon atoms,
$R_2$ is —COOM or —CH$_2$COOM,
M is a hydrogen atom, an alkali metal ion, an alkaline earth metal ion, an ammonium ion or a mixture thereof,
n, m and k are molar ratios of corresponding monomers, wherein n is 0 to 0.95, m is 0.05 to 0.9, and k is 0 to 0.8, and (n+m+k) equals 1, and
the weight average molecular weight is between 500 and 20,000,000 g/mol,
(B) a chelating agent,
(C) a poly-alpha-hydroxyacrylic acid or an alkaline salt thereof or the corresponding polylactone thereof, and
(D) optionally a polycarboxylic acid polymer or an alkaline salt thereof.
The invention also relates to a process for the treatment of a fiber material.

23 Claims, No Drawings

COMPOSITION AND PROCESS FOR THE TREATMENT OF FIBRE MATERIAL

CROSS REFERENCE TO RELATED APPLICATIONS

This is a U.S. national stage of application No. PCT/FI2008/000018, filed on 31 Jan. 2008. Priority under 35 U.S.C. §119(a) and 35 U.S.C. §365(b) is claimed from Finland Patent Application No. 20070096, filed 2 Feb. 2007, the disclosure of which is also incorporated herein by reference.

FIELD OF THE INVENTION

The present invention relates to a composition comprising at least two polymers and a chelating agent and to a process for the treatment of a fiber material, especially a cellulosic fiber material in the presence of at least two polymers and a chelating agent. The composition can be used as a treatment in the bleaching with a peroxygen compound of chemical, mechanical, chemi-mechanical and de-inked pulps and as a treatment in deinking of recycled fibers and in alkaline peroxide bleaching of mechanical, chemical, chemi-mechanical and de-inked pulps. The composition can also be used in deinking of recycled fibers. The composition partly or totally replaces silicate as a stabilizer, especially in the treatment of mechanical and deinked pulps. The present invention also relates to a process for bleaching a cellulosic fiber material with a peroxide compound in an aqueous alkaline medium by using said composition.

DESCRIPTION OF THE RELATED ART

It is well-known that chelating agents can be used as pretreatment for removing harmful metal ions, i.e. generally such transition metal ions as iron and manganese before pulp is bleached with a peroxygen compound, such as hydrogen peroxide, peracetic acid or Caro's acid. In alkaline peroxide bleaching of mechanical pulps, in bleaching of de-inked pulp (DIP) made from recovered waste paper and in the deinking of recovered waste paper, water glass (alkali silicate) and a chelating agent can be added.

Since the common chelating agents such as polyaminopolycarboxylates, e.g. EDTA and DTPA and the corresponding methylenephosphonic acid derivatives of the polyamines are non-biodegradable or show a low biodegradation, there is a target to decrease the use of the common chelating agents as pretreatment or as treatment agents.

Alkaline silicate solutions normally called water glass have been used in stabilizing hydrogen peroxide solutions, which are used in alkaline peroxide bleaching of mechanical pulps.

Water glass is used alone or together with peroxide in de-inking of recovered papers. Sometimes the de-inked pulp is also bleached with alkaline peroxide.

The use of water glass in alkaline peroxide bleaching of chemical pulps has been published, but the method cannot be utilized in full scale, since the silicate can cause very severe precipitation problems. Another disadvantage with water glass is that when the bleaching liquors are recycled and ultimately fed into the recovery boiler, where the so-called black liquor from the cooking process after concentration is burned, the silicate will cause severe scaling and thus decrease the heat transfer in the recovery boiler, which in worst case can cause an explosion of the recovery boiler. Silicates are also known to disturb lime kiln operation. The same applies for the case when a mechanical or a chemi-mechanical plant is integrated with a chemical pulp mill in such a way that effluent containing silicates is directed to the recovery cycle of the chemical pulp mill. Also, if a CTMP mill has an own evaporation plant, the silicate precipitates are troublesome as they precipitate on evaporation units decreasing the heat transfer capacity.

If the silicates, e.g. in form of the water carry-over, enter the paper making process, they will disturb the papermaking process, e.g. by precipitating on hot surface, causing holes in the paper reel etc.

It is known that hydrogen peroxide will decompose very rapidly in an alkaline milieu in the presence of transition metal ions. The most abundant of these ions in pulps are iron and manganese. The copper ion is also very detrimental for alkaline hydrogen peroxide, but normally it can enter the process only via used process waters.

It is also known that iron will start to precipitate already below pH 7, first in colloidal form. The formed iron hydroxides, oxyhydroxides etc are much more catalytically active than iron ions. Also manganese can, at least partly, be in precipitated form, but it has been claimed that in the presence of hydrogen peroxide, manganese should be in dissolved form.

The theory of the function of water glass varies, but one theory is that water glass will deactivate the catalytic surface of iron and other heavy metal ion "precipitates". In order to avoid the detrimental effect of manganese ions, a chelating agent is often introduced into the bleaching process or the pulp is pretreated with a chelating agent. The most common chelating agents are EDTA and DTPA, which belong to the group of polyaminopolycarboxylates. The corresponding phosphonates, EDTMPA and DTPMPA can also be used, but they are much more expensive than the polyaminopolycarboxylates. They have also the disadvantage that they contain phosphorus, which is not a wanted component, when the environmental regulations are becoming stricter and stricter.

In the deinking of waste paper, water glass has also other functions, e.g. water glass improves ink detachment, it will disperse the ink and act as a buffer keeping the pH constant. Therefore a partly replacement of water glass would also be advantageous and at the same time decrease the precipitation problems connected with the use of water glass.

According to the above there is a need to partly or totally replace water glass (silicates) in alkaline peroxide bleaching processes and in pulping processes, which use water glass, e.g. in alkaline peroxide bleaching of mechanical and de-inked pulps and in de-inking of recovered paper. There have been suggestions to use phosphonates, but they should be used in quite high dosages and the phosphorus problem in the waste waters would still remain. Since the common phosphonates are non-biodegradable, there has been much studies about the adverse effect on mobilizing heavy metals, e.g. from sediments in waterways. If phosphonates would be used, the dosage of these substances should be decreased.

Japanese patent publication JP 1266295 (published 24 Oct. 1989) describes a pretreatment method for bleaching pulp with hydrogen peroxide in alkaline conditions in the presence of sodium silicate and adding 0.05-1% by weight (based on dry pulp) of a copolymer of 3-allyloxy-2-hydroxypropanesulfonic acid (AHPS) and (meth)acrylic acid in the pretreatment.

According to Japanese patent application JP 1148890 (published 12 Jun. 1989) the same kind of polymer in an amount of 0.05-1% by weight (based on dry pulp) has been used instead of e.g. DTPA in alkaline peroxide bleaching. In JP 1148890 the bleaching performance of a number of different AHPS-acrylic acid copolymers are shown and compared e.g. with the performance of DTPA.

In the both JP patent applications the tested amounts are very big, since normally the chelating agents are used in an amount of 0.5 to 2 kg per ton pulp as 100% sodium salt.

EP 0 814 193 discloses a silicate-free stabilizing agent for peroxide-bleaching procedures, comprising a) a first component selected from homopolymers of alpha-hydroxyacrylic acid and copolymers of alpha-hydroxyacrylic acid with other comonomers, and water soluble salts and polylactones of the mentioned homo- or copolymers in combination with b) a second component selected from homopolymers and copolymers of acrylic acid, methacrylic acid and maleic acid, copolymers of at least one of the above-mentioned acids with other comonomers and salts of above-mentioned homopolymers and copolymers, and c) a third component selected from the common chelating acids DTPA and TTHA and salts thereof, and optionally d) a fourth component selected from water-soluble magnesium salts. The poly-alpha-hydroxyacrylic acid (PHAA) is used as its sodium salt.

WO 2005080673 (referred as WO 1 later) discloses a process for bleaching a fiber material with an alkaline peroxide solution in the presence of a chelating agent and a copolymer of 3-allyloxy-2-hydroxypropanesulfonic acid (AHPS) with (meth)acrylic acid, maleic acid or itaconic acid. This patent application also discloses a composition comprising said copolymer and the chelating agent for use as a stabilizer in alkaline peroxide bleaching for replacing partly or totally water glass and in the bleaching of fiber material.

WO 2005108673 (WO 2) discloses the same composition which additionally comprises an alkaline earth metal salt and the use of the same.

WO 2004063461 (WO 3) discloses a composition of poly-alpha-hydroxyacrylic (PHAA) alkaline salt and a polycarboxylate polymer and the use of the composition in alkaline peroxide bleaching of mechanical pulps and in deinking applications, when the composition is made from the alkaline salt of PHAA and a raw acidic polycarboxylate polymer.

WO 2004063276 (WO 4) discloses a composition of the PHAA corresponding polylactone and a polycarboxylate salt and the use of the composition in alkaline peroxide bleaching of mechanical pulps and in deinking applications, when the composition is made by adding the PHAA corresponding polylactone into the raw acidic polycarboxylate.

Though these compositions work well in many applications, they seem to fail especially when softwoods (conifers) are used and/or when the manganese and iron content in the wood pulp is high.

SUMMARY OF THE PRESENT INVENTION

According to the present invention it has now surprisingly been found that by using a copolymer of AHPS and an unsaturated carboxylic acid, such as acrylic acid, methacrylic acid, maleic acid or itaconic acid, together with a chelating agent and with a polymer composition made from the alkaline salt of PHAA and a polycarboxylate polymer or made from the PHAA corresponding polylactone and a polycarboxylate polymer, either mixed together or added separately, a very good bleaching performance can be achieved and a total replacement of water glass can be achieved, if necessary from the pulping and paper making point of view. Surprisingly, the combination of the said polymers, the chelating agent showed an improved effect as compared to the effect of a combination of an AHPS-containing copolymer and a chelating agent or a combination of an alkaline salt of PHAA and a polycarboxylate polymer or copolymer or a combination of the PHAA corresponding polylactone with a polycarboxylate polymer or copolymer. Test results unexpectedly showed a clear synergistic effect.

The combination of at least two polymers, i.e. the AHPS-containing copolymer and the alkaline salt of PHAA or its corresponding polylactone, and a chelating agent and optionally a third polymer, i.e. a polycarboxylate polymer or copolymer, can very effectively be used as a stabilizer in bleaching of a mechanical or de-inked pulp with a peroxygen compound, such as hydrogen peroxide, peracetic acid or Caro's acid. The present invention makes it possible to partially or totally replace water glass in bleaching and deinking processes by using the combination of at least the two polymers and a chelating agent.

The present invention provides a process for treatment of a fiber material comprising the step of contacting the fiber material in an aqueous medium with an AHPS-containing copolymer, a chelating agent, a poly-alpha-hydroxyacrylic acid or a salt or the polylactone thereof, optionally a polycarboxylate polymer or copolymer. The components including at least the two polymers and the chelating agent can be added separately or preferably as a ready-made mixture (composition).

The present invention also relates to a composition comprising the AHPS-containing copolymer, the chelating agent, the PHAA or a salt or the polylactone thereof, optionally a polycarboxylate polymer or copolymer.

The composition and process according to the invention can be used as a pre-treatment of chemical, mechanical, chemi-mechanical pulps and deinked pulps, which are bleached with alkaline peroxide.

The composition and process according to the invention can also be used in the bleaching of all kind of chemical, mechanical, chemi-mechanical pulps and deinked pulps by using hydrogen peroxide as the bleaching agent.

The composition and process are also suitable in deinking of recycled pulps, in which water glass and hydrogen peroxide are commonly used.

The composition can also be used in sodium dithionite bleaching of mechanical and de-inked pulps.

The alkaline peroxide bleaching process for mechanical, chemi-mechanical and de-inked pulps according to the invention can be practiced as a single stage of bleaching or in a two-stage process, where the pre-bleached pulp is entering the second stage. Any consistency can be used, but it is most preferable to use medium consistency in the first stage and high consistency in the second stage.

If needed, the bleaching can be preceded by a pretreatment with a chelating agent in order to reduce the amount of transition metals entering the bleaching process.

In the de-inking process the composition of the present invention can be used in repulping or in a disperger or in a kneader which possibly is followed by a soaking tower to which hydrogen peroxide can be fed. In the de-inking process the composition of the present invention can also be used in a separate bleaching stage or any process stage where hydrogen peroxide is present.

The composition, either as ready-made mixture or as combination of at least of two polymers and a chelating agent, can be used as total or partial replacement of water glass in those processes, where water glass are commonly used.

The composition or components of the composition are preferably not added in hydrogen peroxide or in alkali or in alkaline peroxide bleaching liquor or in water glass, if water glass is only partly replaced by the components or composition of the invention, since the effectiveness will then decrease. The composition or the components of the compositions should be added into the pulp before it will be contacted with alkali or alkaline bleaching liquor. The time from this can vary from less than one second to minutes depending on whether the composition or the components of the invention are added separately from the alkaline components into a chemical mixer or the composition or the components are added into the pulp to be bleached earlier in the process where a good mixing of the composition or the components can be guaranteed. The reason for this is not known, but it assumed that the alkali will start to precipitate one or several polymer components and thus rendering a good mixing of the composition or the polymer components impossible. The preferred addition point is therefore a point, where a good mixing of the composition or the components with the pulp to be bleached can be achieved.

It is not known why it is easier to get good bleaching results in the alkaline peroxide bleaching of mechanical pulps from hardwoods (deciduous trees) without silicate than with softwoods (conifers). It is known that in the alkaline peroxide bleaching of hardwoods the initial pH of say 10.5 will decrease very rapidly below 7, while in the alkaline peroxide bleaching of softwoods, the final pH in general will remain above 8. It is known that peroxide is more unstable the higher the pH. Therefore the pH profile during the alkaline peroxide bleaching without silicate can be reason for this feature.

It has also been shown that the relative bleachability of different mechanical pulps made from the same wood species follows the following order: GW (Groundwood)>PGW (Pressure Groundwood)>CTMP (ChemiThermoMechanical Pulp)>TMP (ThermoMechanical pulp)>RMP (Refiner Mechanical Pulp). (Presley, J. R, and Hill, R. T., Section V, Section V: The Technology of Mechanical Pulp Bleaching; Chapter 1: Peroxide Bleaching of (Chemi)mechanical Pulps in Pulp Bleaching—Principle and Practice, Dence, W. C. and Reeve, D. W. Tappi Press, Atlanta, Ga., the USA, p. 463). This feature should be taken into account for when comparing the bleaching results with different kinds of mechanical pulps. The RMP is nowadays an obsolete refining process.

The theory how the components will work together is not clear, since the copolymer containing AHPS cannot stabilize very well alkaline hydrogen peroxide solutions and also gives in general poor bleaching performance. The chelating agents stabilize quite well the above mentioned alkaline peroxide, but cannot give a good bleaching result. The common chelating agents mentioned above, will bind the soluble manganese ions in the alkaline peroxide solutions, but since iron is then in solid form, either colloidal or in precipitated form, chelating agents cannot any more bind the solid compounds. The same is valid for the solid forms of manganese compounds. The alkaline salt of PHAA or the corresponding polylactone will give good bleaching results especially when the manganese and iron content is low.

The polymer composition with a chelating agent according to the invention can somehow bind to the solid surfaces or inactivates the catalytic effect of the solid particles. Thus a combined effect will be obtained. The common chelating agents cannot, when used alone, give a good bleaching performance for mechanical pulps and deinked pulps, high brightness gain and a sufficient amount of residual peroxide, which indicates that peroxide has mainly been consumed for bleaching and not for decomposition processes and where the unreacted hydrogen peroxide can be recycled back to the bleaching. Therefore there must be some synergetic effect between the components used according to the invention.

One special feature of the invention is that by using the composition or the components of the composition according to invention, the dewatering properties will much improve compared with the ones when water glass has been used. This will mean that much less energy is needed in the dewatering processes in such ones as on paper machine and in dewatering presses and screws. At the same time the production throughput can be increased. The reason for this is not known, but at least during the bleaching water glass should be in colloidal form. The colloids can be reason that the dewatering properties of the pulps are not the best ones. Another reason for the negative effect on dewatering could be the fact that waterglass disturbs the function of microparticle silica in a papermaking process.

DETAILED DESCRIPTION OF THE INVENTION

In a first aspect of the present invention there is provided a stabilizing composition comprising following components
(A) a polymer having the following formula:

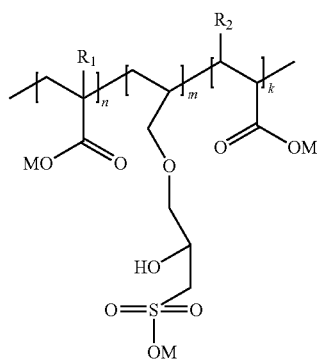

I wherein
$R_1$ is a hydrogen atom or an alkyl group containing 1 to 12 carbon atoms,
$R_2$ is —COOM or —CH$_2$COOM,
M is a hydrogen atom, an alkali metal ion, an alkaline earth metal ion, an ammonium ion or a mixture thereof,
n, m and k are molar ratios of corresponding monomers, wherein n is 0 to 0.95, m is 0.05 to 0.9, and k is 0 to 0.8, and (n+m+k) equals 1, and
the weight average molecular weight is between 500 and 20,000,000 g/mol,
(B) a chelating agent
(C) a poly-alpha-hydroxyacrylic acid or an alkaline salt thereof or the corresponding polylactone thereof.
(D) optionally a polycarboxylic acid polymer or an alkaline salt thereof.

In a second aspect of the present invention there is provided a process for the treatment of a fiber material comprising the step of contacting the fiber material in an aqueous medium with following components
(A) a polymer having the following general formula:

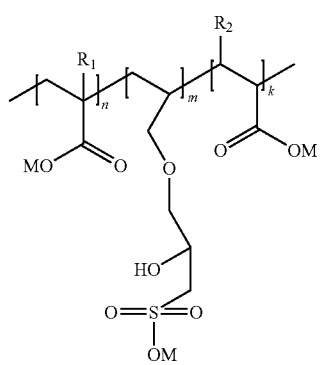

I where in $R_1$ is a hydrogen atom or an alkyl group containing 1 to 12 carbon atoms, $R_2$ is —COOM or —CH$_2$COOM, M is a hydrogen atom, an alkali metal ion, an alkaline earth metal ion, an ammonium ion or a mixture thereof, n, m and k are molar ratios of corresponding monomers, wherein n is 0 to 0.95, m is 0.05 to 0.9, and k is 0 to 0.8, and (n+m+k) equals 1, and the weight average molecular weight is between 500 and 20,000,000 g/mol, (B) a chelating agent (C) a poly-alpha-hydroxyacrylic acid or an alkaline salt thereof or the corresponding polylactone thereof, (D) optionally a polycarboxylic acid polymer or an alkaline salt thereof.

The composition of the present invention can be used as a stabilizer in the bleaching of a fiber material in an aqueous medium or as a stabilizer in the deinking of a recycled fiber material.

The above alkali metal ion is preferably sodium or potassium ion, and the alkaline earth metal ion is preferably magnesium ion.

The above alkaline salt is preferably a sodium, potassium or magnesium salt.

Regarding component (A) a preferred comonomer with AHPS is acrylic acid ($R_1$=H), methacrylic acid ($R_1$=CH$_3$), maleic acid ($R_2$=COOM) or itaconic acid ($R_2$=CH$_2$COOM). When k is 0 in formula I the preferred comonomer is acrylic acid or methacrylic acid, and when n is 0 the preferred comonomer is maleic acid or itaconic acid. When both k and n are not 0 the preferred comonomers with AHPS are (meth)acrylic acid and maleic acid or itaconic acid.

The monomers are randomly distributed along the polymer chain of formula I, and preferably n is 0.4 to 0.9, m is 0.1 to 0.5, and k is 0 to 0.5.

If the system in pretreatment or in alkaline peroxide bleaching contains high amount of calcium ions, as is the case, when so-called white water from papermaking process is circulated to the pulping and/or bleaching operations, it is advantageous to use maleic acid or itaconic acid (k>0) as one of the comonomers in order to increase the calcium binding ability of the polymer. It is preferable in normal cases that the polymer only contains AHPS and a monomer containing one carboxylic acid, such as acrylic acid, since a copolymer comprising multiple monomers is usually more difficult to produce.

The weight average molecular weight of the copolymer of formula I should be between 500 and 20,000,000 g/mol, preferably between 1,000 and 1,000,000 g/mol and most preferably between 2,000 g/mol and 500,000 g/mol.

If the weight average molecular weight is lower than about 500 g/mol, the efficiency of the polymer becomes too low. If the average molecular weight is higher than 20,000,000 g/mol, handling and dosage become a problem due to high viscosity of the polymer solution.

To increase the molecular weight of the copolymer and/or to enhance the efficiency of the copolymer, a cross linker may be used in an amount of 0 to 20% by mole, preferably 0 to 10% by mole, of the total monomer content. Suitable cross linkers are, for example methylenebisacrylamide, ethylene glycol divinyl ether, di(ethylene glycol) divinyl ether, tri(ethylene glycol) divinyl ether and vinyl or allyl terminated polymers, but are not limited to these.

To decrease molecular weight of the copolymer and/or to enhance the efficiency of the copolymer, a chain transfer agent may be used in an amount of 0 to 20% by mole, preferably 0 to 10% by mole, of the total monomer content.

Suitable chain transfer agents are, for example thiols (e.g. butylmercaptan) and alcohols (e.g. isopropanol), but are not limited to these.

The chelating agent (B) to be used together with the copolymer (A) of formula I may be a chelating agent having formula II, III or IV below.

A preferred chelating agent is a compound having the following general formula:

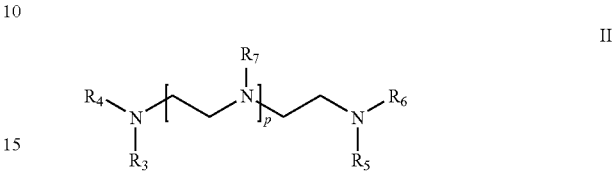

II wherein p is 0 or an integer of 1 to 10, $R_3$, $R_4$, $R_5$, $R_6$ and $R_7$ are independently a hydrogen atom or an alkyl chain having 1 to 6 carbon atoms and containing one or more active chelating ligands, such as carboxylic, phosphoric or hydroxyl group(s) or a salt thereof.

The alkyl chain is preferably methylene —CH$_2$— or ethylene —CH$_2$CH$_2$—.

In formula II $R_3$, $R_4$, $R_6$ and $R_7$ preferably represent the same group.

Examples of chelating agents according to the above formula II are polyaminopolycarboxylic acids and polyaminopolymethylenephosphonic acids.

The polyaminopolycarboxylic acids can be produced by the conventional route from the polyamine and formaldehyde and sodium cyanide or hydrocyanic acid. The more suitable route for small scale production is to use a haloacetic acid, especially monochloroacetic acid as a reactant.

Preferred polyaminopolycarboxylic acids are:

DTPA: p=1, $R_3$=$R_4$=$R_5$=$R_6$=$R_7$=—CH$_2$COOH

TTHA: p=2, $R_3$=$R_4$=$R_5$=$R_6$=$R_7$=—CH$_2$COOH

EDTA: p=0, $R_3$=$R_4$=$R_5$=$R_6$=—CH$_2$COOH

HEDTA: p=0, $R_3$=$R_4$=$R_5$=—CH$_2$COOH, $R_5$=—CH$_2$CH$_2$OH

EDDS: p=0, $R_3$=$R_5$=H, $R_4$=$R_6$=—CH(COOH)CH$_2$COOH (ethylenediamine-disuccinic acid)

The polyaminopolymethylenephosphonic acids are made conventionally from the corresponding polyamine, formaldehyde and phosphonic acid. With the higher amines a full substitution with acetic acid groups or methylenephosphonic acid groups will become more and more difficult. These chelating agents will also perform well in the composition but an incomplete substitution will make the chelating agents more prone for decomposition by hydrogen peroxide.

Preferred polyaminopolymethylenephosphonic acids are:

DTPMPA: p=1, $R_3$=$R_4$=$R_5$=$R_6$=$R_7$=—CH$_2$POO$_2$H$_2$

TTHMPA: p=2, $R_3$=$R_4$=$R_5$=$R_6$=$R_7$=—CH$_2$POO$_2$H$_2$

EDTMPA: p=0, $R_3$=$R_4$=$R_5$=$R_6$=—CH$_2$POO$_2$H$_2$

Another preferred chelating agent is a compound having the following general formula:

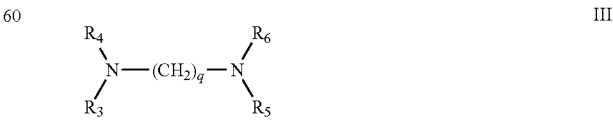

III wherein q is an integer of 3 to 10, $R_3$, $R_4$, $R_5$ and $R_6$ are independently a hydrogen atom or an alkyl chain having 1 to 6 carbon atoms and containing one or more active chelating ligands, such as carboxylic, phosphonic or hydroxyl group(s) or a salt thereof.

The alkyl chain is preferably methylene —$CH_2$— or ethylene —$CH_2CH_2$—.

In formula III $R_3$, $R_4$ and $R_6$ preferably represent the same group.

Examples of chelating agents according to the above formula III are the commercially available hexamethylenediamine tetra(acetic acid) (q=6) and tetramethylenediamine tetra(methylenephosphonic acid) (q=4) having the following formulae:

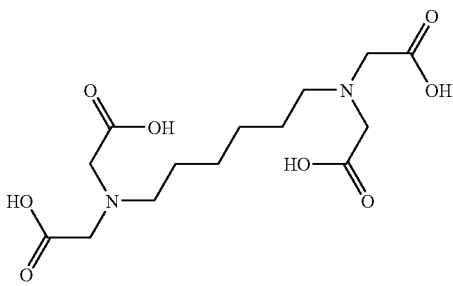

Hexamethylenediamine Tetraacetic Acid

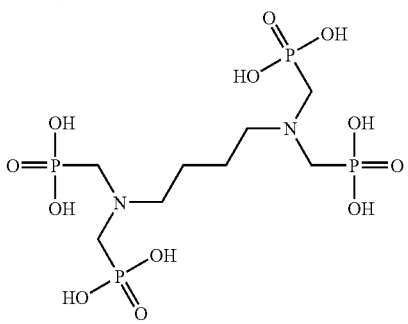

Tetramethylenediamine Tetra(Methylenephosphonic Acid)

Yet another preferred chelating agent is a compound having the following general formula:

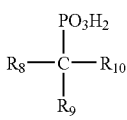
IV wherein
$R_8$ is a hydrogen atom, an alkyl group containing 1 to 6 carbon atoms or an alkyl chain having 1 to 6 carbon atoms and containing a carboxylic, phosphonic or hydroxyl group,
$R_9$ is a hydrogen atom, hydroxyl group, phosphonic group, carboxylic group or alkyl chain having 1 to 6 carbon atoms and containing one or two carboxylic groups, and
$R_{10}$ is a hydrogen atom, hydroxyl group, carboxylic group, alkyl group containing 1 to 6 carbon atoms or alkyl chain having 1 to 6 carbon atoms and containing a carboxylic group, or a salt thereof.

The alkyl chain is preferably methylene —$CH_2$— or ethylene —$CH_2CH_2$—.

An example of the non-nitrogen containing chelating agents according to the above formula IV is 1-hydroxyethylidene-1,1-diphosphonic acid (HEDP).

A further preferred chelating agent is a compound having the following general formula:

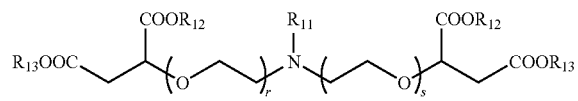
V wherein $R_{11}$ is
a hydrogen atom
an alkyl chain containing 1-30 carbon atoms,
an alkyl chain containing 1-30 carbon atoms and 1-10 carboxylic acid groups attached to said chain, or alkali or alkaline earth metal salt thereof,
an alkyl chain containing 1-30 carbon atoms and 1-10 carboxylic acid esters attached to said chain,
a (poly)ethoxylated hydrocarbon chain containing 1-20 ethoxyl groups, or
a carboxylic acid amide containing 1-30 carbon atoms, where N—$R_{11}$ bond is an amide bond,
$R_{12}$ and $R_{13}$ are: hydrogen, an alkali metal ion or an alkaline earth metal ion or an alkyl group containing 1-30 carbon atoms,
r is 0 or 1, and
s is 0 or 1.

Preferred N-bis- or tris-[(1,2-dicarboxy-ethoxy)ethyl] amines of formula V are following

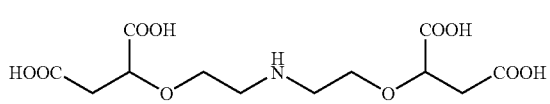
B1

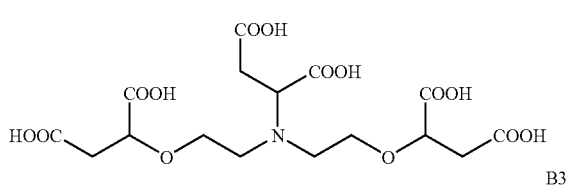
B2

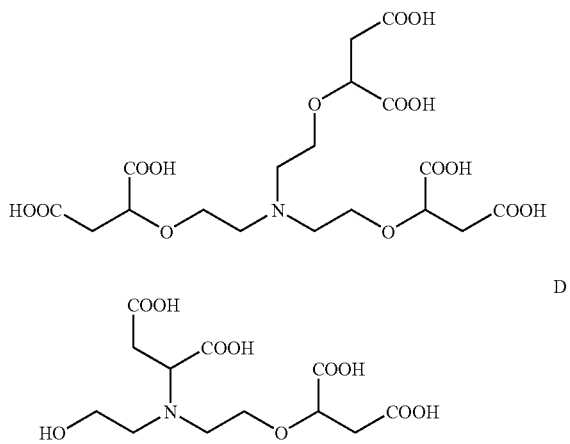

B1 = N-bis[2-(1,2-dicarboxy-ethoxy)-ethyl]-amine
B2 = N-bis[2-(1,2-dicarboxy-ethoxy)-ethyl]-aspartic acid
B3 = N-tris[2-(1,2-dicarboxy-ethoxy)-ethyl]-amine
D = N-[2-(1,2-dicarboxy-ethoxy)-ethyl]-(N-2-hydroxyethyl)aspartic acid A preferred N-bis-(1,2-dicarboxy-ethyl)amine of formula V is iminodisuccinic acid (ISA) having the following formula:

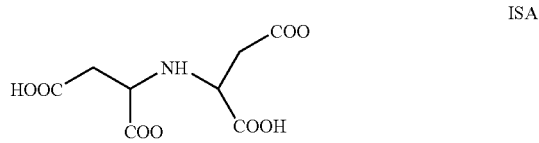

ISA

Though the formulas of the chelating agents are depicted above as acids, they are commercially normally sold as their alkali salts, mainly as their sodium salts and the formulas given above have to be understood as including both the free acids and their salts.

Component (C) is a poly-alpha-hydroxyacrylic acid (PHAA) or an alkaline salt thereof or the polylactone of PHAA (PLAC). Polymer (C) can have a molecular weight of at least 5000, preferably at least 10000, and more preferably at least 15000. As the polylactone is insoluble in water the molecular weights have been measured for the corresponding sodium salt obtained by alkaline hydrolysis of the polylactone.

The optional component (D) is a polycarboxylic acid polymer or an alkaline salt thereof. Preferable, the polycarboxylic acid polymer is a homopolymer of acrylic acid or methacrylic acid or a copolymer of (meth)acrylic acid and another unsaturated carboxylic or dicarboxylic acid. The polycarboxylic acid polymer can be prepared by homopolymerization of acrylic or methacrylic acid or by copolymerization of acrylic acid and/or methacrylic acid with an unsaturated carboxylic acid or dicarboxylic acid, such as maleic or itaconic acid. Polymer (D) can have a molecular weight of at least 4000, preferably at least 10000, and more preferably at least 30000. The molecular weight can be even higher, although with very high molecular weights the viscosity of the product will increase considerably at high concentrations.

Preferably polymer (D) comprises a copolymer of acrylic and/or methacrylic acid with maleic acid, wherein the molar ratio of acrylic acid and/or methacrylic acid to maleic acid is from 80:20 to 20:80, preferably from 70:30 to 50:50. The maleic acid is commonly used as maleic acid anhydride in the polymerization processes.

The components of the inventions can be in form of alkaline salts, especially if the components are added separately or in a composition without an alkaline salt of PHAA.

The composition according to the invention can be made by mixing the alkaline salts. In order to avoid phase separation or precipitation it is preferred that the pH is under 9, more preferable under 8 and most preferable under 7.

The composition can be made in any order of mixing. It can be made in the way shown in the WO3 and WO4. This means that an alkaline salt of PHAA or its polylactone is added into the raw polycarboxylate polymer (C). Thus, the pH will remain under 7. The alkaline salt of polymer (A) and the alkaline salt of chelating agent (B) can then be added into the above mentioned polymer composition and thus avoiding a too high pH.

If the composition comprises component (D), it is most preferred to mix first components (A) and (B) into component (D) and then add the salt of PHAA or its polylactone (C) into the previous mixture. It is preferred to have polymer (D) in a raw acidic form in order to get a good storage stability of the composition. The acidic pH ensures also the good solubility of a magnesium salt, if this would be used in the mixtures.

Components (A), (B) and (D) are normally available as commercial products as alkaline salts. Component (C), i.e. PHAA, is also available as alkaline salts. These alkaline salts can of course be mixed and reacted with the alkaline salt of PHAA or its polylactone. Phase separation and or precipitation can follow. These mixtures can be used, if the storage tanks have a mixing device. This is not common in pulp and paper mills. Therefore it preferred that the composition has a lower pH than 9, preferably lower than 8 and most preferably lower than pH 7, i.e. an acidic pH.

The polymers and the chelating agent can be added separately or as a composition mixture.

The weight ratio of the compounds (A):(B):(C) can be 0.1 to 1:0.1 to 1:1, preferably 0.25 to 1:0.25 to 1:1, more preferably 0.5 to 1:0.5 to 1:1 calculated as active substance.

The weight ratio of the compounds (A):(B):(C):(D) can be 0.1 to 1:0.1 to 1:1:0.1 to 1, preferably 0.25 to 1:0.25 to 1:1:0.25 to 1, more preferably 0.5 to 1:0.5 to 1:1:0.5 to 1, calculated as active substance.

It is crucial to have enough of the polymer (A) or/and (D) in order to not deactivate the polymer (C). The chelating agent (component B) will also help in this connection.

The total amount of the components (A), (B) and (C), and optionally the component (D) (as an aqueous product containing component (C) as PLAC at maximum 10%), added separately or as a mixture, is preferably 2-10 kg per ton of dry fiber material, more preferably 2-6 kg per ton of dry fiber material, and most preferably 2 to 5 kg per ton of dry fiber material.

The fiber material is preferably a cellulosic fiber material, especially a mechanical, chemi-mechanical or deinked pulp. The cellulosic fiber material can also be chemical pulp or any regenerated cellulose material, such as viscose, or flax or cotton.

If a composition mixture is made according to the invention, the normal content of active materials in the mixture can be at least 10%, preferably at least 15%, and more preferably at least 20% by weight, but also more diluted solutions can be used in the application process if the dosage is increased.

In one embodiment of the process of the present invention the treatment comprises bleaching the fiber material with an alkaline peroxide solution in the presence of the polymers and a chelating agent.

In the bleaching of chemical pulp, the stages can also be reinforced with oxygen, the abbreviation of stages depicted in the professional literature as EOP, Eop, PO or OP.

The peroxide bleaching of mechanical pulps with the process according to the invention can comprise all kind of mechanical pulps, e.g. stone groundwood pulp (SGW), refiner mechanical pulp (RMP), pressure groundwood (PGW), thermomechanical pulp (TMP), but also chemically treated high-yield pulps such as chemithermomechanical pulp (CTMP). The invention is also useful in bleaching of deinked pulps. Deinked pulp can be made using mixed office waste (MOW), newsprint (ONP), magazines (OMG) etc. as raw material and the composition of the present invention can be used in any process stage where peroxide is used. The invention can also be practiced in refiner bleaching of mechanical pulps and in alkaline peroxide mechanical pulp (APMP, or P-RC APMP), in which wood chips are impregnated with alkaline peroxide solution before or during refining. In these applications the invention is very advantageous, since the biggest obstacle to use hydrogen peroxide in these applications has been that water glass cannot be used, since the sodium silicate will precipitate on the refiners, dewatering presses or chemical make-up systems and thus making the process unpractical.

The residence time in the bleaching can vary within a wide range, from 30 to 240 minutes, preferably from 45 to 180 minutes and most preferably from 60 to 120 minutes. The residence time will also depend on the temperature used in the bleaching.

The composition according to the invention can be used as a mixture or the ingredients can be added separately.

The bleaching of mechanical pulps can be carried out at a temperature of from 30° C. to 95° C., preferably at a temperature of from 50° C. to 90° C. In the case of APMP process, the temperature can occasionally raise up to 150° C. in the refiner and up to 100° C. in the bleaching tower. The bleaching can be carried out at a consistency of choice, but it is most preferably to carry out the bleaching at a high consistency, i.e. about 30% or higher. Bleaching can also be carried in two stages with a dewatering stage between the stages. The stages can be carried out at a consistency of choice, but it is most preferably to use medium consistency in the first stage and a high consistency in the second stage. This makes it possible to remove the detrimental substances efficiently.

The bleaching stage can be preceded by a chelating agent stage and dewatering and thus improve the bleaching performance. In the chelating agent stage any of the above defined chelating agents can be used.

The ratio between the alkali and hydrogen peroxide can vary in a wide range, depending on raw materials and degree of bleaching. Also alternative alkali sources, like sodium carbonate, can be utilized. The use of sodium carbonate is especially preferably to use, at least as a partial replacement of sodium hydroxide, when wastepaper is deinked with the total replacement of water glass using the composition according to the invention. The necessary buffer capacity can be ensured in this way.

Also magnesium hydroxide and magnesium carbonate and/or sodium carbonate can be used as whole or partial displacement of the common alkali, sodium hydroxide.

In another embodiment of the process of the present invention the treatment comprises treating the chemical fiber material in the aqueous medium comprising the polymers, and a chelating agent.

The treatment can be followed by a bleaching with a peroxygen compound optionally in the presence of the chelating agent, and the polymers. The peroxygen compound can be hydrogen peroxide, peracetic acid or Caro's acid.

The consistency of this treatment is preferably around 10% in order to ensure an efficient metal removal. The pH is preferably from 3 to 7, more preferably from 4 to 6.5 and most preferably from 4.5 to 6. The treatment can be carried at any temperature, but it is preferably carried at the same temperature as the bleaching stage, but however below 100° C.

In yet another embodiment of the process of the present invention the treatment comprises de-inking recycled fiber material in the aqueous medium containing the chelating agent, and the polymers.

In the de-inking process the polymer composition according to the invention can be used in repulping of wastepaper or in a disperger or in a kneader which possibly is followed by a soaking tower to which hydrogen peroxide can be fed. In the de-inking process the polymer composition of the present invention can also be used in a separate bleaching stage or any process stage where hydrogen peroxide is present.

The pH in the alkaline bleaching, including the de-inking in the presence of hydrogen peroxide, is from 7 to 13, preferably from 7 to 12, and more preferably from 7 to 11.

The present invention is illustrated by following examples, which will not limit the scope of the invention.

In this specification the percentages are % by weight unless otherwise specified. In the tables below the amounts of chemicals given as kg/tp refer to kg per ton dry pulp.

EXPERIMENTAL

Bleaching

1. CTMP (=Chemical Thermomechanical Pulp)

An industrial CTMP (spruce, *picea abies*) pulp was bleached in laboratory using different stabilator blends. The pulp contained Fe<10 mg/kg, Mn 24 mg/kg, Ca 824 mg/kg and Cu<1 mg/kg. Initial brightness of the pulp was 60.9% ISO. The reaction temperature was 78° C., reaction time 72 minutes, consistency 12%.

Chemical charges were: $H_2O_2$ 22 kg/tp, NaOH 13 kg/tp, stabilizer blend dosages were 3 kg/tp as product. Bleachings were carried out in plastic bags. Pulp was preheated in microwave oven to reaction temperature. Some de-ionized water at reaction temperature was added to the pulp before chemicals addition. Chemicals were added in following order: 1. stabilizer, 2. NaOH and 3. $H_2O_2$, and mixed well after every addition. Stabilizer was diluted 1:10, and NaOH and $H_2O_2$ were also diluted before addition with warm de-ionized water. With de-ionized water at reaction temperature the consistency was adjusted to 12%. Initial-pH was measured and the plastic bag sealed hermetically and put into water bath. After desired delay, filtrate for residual peroxide and —NaOH analysis and final pH was filtered and the pulp was washed with warm de-ionized water, dewatered, homogenized and acidified with $SO_2$ water (pH 4.5, consistency 2%, 15 minutes). After acidification pulp was dewatered and homogenized. Test sheets for optical measurements were carried out according to standard ISO 3688, and sheets were measured according to standard ISO 2470.

2. TMP (=Thermomechanical Pulp)

An industrial TMP (spruce, *picea abies*) pulp was bleached in laboratory using different stabilizer blends and stabilizer products. The pulp contained Fe<10 mg/kg, Mn 18 mg/kg, Ca 787 mg/kg and Cu<1 mg/kg. Initial brightness of the pulp was 61.1% ISO. The reaction temperature was 73 C., reaction time 80 minutes, consistency 12%. Chemical charges were: H2O2 45 kg/tp, NaOH 37.9 kg/tp (total alkali), stabilizer or blend dosages varied 3. Bleachings were carried out in plastic bags similarly as in CTMP bleaching.

Making the Compositions

Example 1

To Make Copolymer A

Copolymer A was made according to Example 1 of WO1.

Example 2

To Make Polymer D

Polymer D was made according to Example 2 of WO4.

Example 3

To Make a Composition According to the Invention

Some deionized water was added to a beaker. MA-AA copolymer (D), DTPA (B) and AHPS-AA copolymer (A) were added to the water at room temperature with moderate stirring (magnetic stirrer). PLAC (Polymer C) was weighed to the beaker. Blend was warmed up to 50-60° C., mixed with magnetic stirrer at least 30 min, or until blend seemed clear. Deionized water was added to adjust the weight of the batch. Blend was cooled down to room temperature and filtered with 300 µm filter.

The raw materials and the amounts thereof are set forth in Table 1.

TABLE 1

| Raw materials | Concentration | Dosage, g | Dosage as product | | |
|---|---|---|---|---|---|
| PHAS | 100% | 8.3 | 8.30% | As PHAS | 13.0% |
| MA-AA | 44% | 12.509 | 12.50% | | |
| DTPA | 50% | 11.004 | 11.00% | | |
| AHPS | 50% | 10.843 | 10.60% | | |
| Water | 100% | | 57.60% | | |

PHAS was in the form of the polylactone PLAC with a molecular weight of about 20 000.

MA-AA was an unneutralized raw maleic acid:acrylic copolymer in ratio of 40:60 and with a molecular weight of 44 000 g/mol DTPA was a commercial solution containing 50% of diethylenetriamine pentaacetic acid pentasodium salt.

AHPS was a sodium salt of AHPS-AA copolymer with a molecular weight of 5 000 g/mol.

Example 4

Bleaching experiments were carried out as described above. Spruce-TMP was used in the bleachings.

Composition of blend S06035 is below:

| Blend SO6035 | As such | As solids | Ratio to invention |
|---|---|---|---|
| PLAC (compound C) | | 8.3% | 1.0 |
| MA:AA copolymer (D) | 12.5% | 5.5% | 1.0 |

Blend S06015 is same as blend A=WO1 and Stabilator C as blend AC=invention in Table 3 (described further below Table 3).

The results are set forth in Table 2.

TABLE 2

| Spruce-TMP | Ref. | P 2 | P 3 | P 4 | P 5 | P 6 | P 7 | P 8 | P 9 |
|---|---|---|---|---|---|---|---|---|---|
| T, ° C. | | 73 | 73 | 73 | 73 | 73 | 73 | 73 | 73 |
| t, min | | 80 | 80 | 80 | 80 | 80 | 80 | 80 | 80 |
| Consistency, % | | 12 | 12 | 12 | 12 | 12 | 12 | 12 | 12 |
| Initial pH | | 10.8 | 11.0 | 10.8 | 10.7 | 10.5 | 10.5 | 10.7 | 10.6 |
| Final pH | | 9.6 | 9.8 | 9.8 | 9.6 | 9.5 | 9.6 | 9.4 | 9.5 |
| $H_2O_2$, kg/tp | | 45 | 45 | 45 | 45 | 45 | 45 | 45 | 45 |
| NaOH, kg/tp | | 35 | 37.9 | 37.9 | 37.9 | 37.9 | 37.9 | 37.9 | 37.9 |
| Silicate, kg/tp (prod.) | 25 | | | | | | | | |
| Blend S06035, kg/tp (prod.) | | | | | | | | 4 | |
| Blend S06015, kg/tp (prod.) | | | | | | | | | 4 |
| Stabilator C, kg/tp (prod.) | | | 2 | 4 | 6 | 8 | 10 | | |
| Residual-$H_2O_2$, kg/tp | | 18.7 | 4.2 | 7.3 | 14.9 | 14.2 | 20.4 | 2.7 | 5.7 |
| Residual-NaOH, kg/tp | | 5.4 | 2.6 | 2.3 | 2.6 | 2.1 | 3.1 | 1.9 | 1.8 |
| Brightness, % ISO | 61.1 | 77.0 | 75.4 | 76.4 | 77.3 | 77.2 | 77.3 | 73.9 | 75.4 |
| Yellowness | 27.8 | 17.5 | 19.0 | 18.2 | 17.5 | 17.8 | 17.4 | 19.8 | 19.3 |
| Whiteness CIE D65/10 + UV | 8.4 | 39.8 | 36.6 | 38.0 | 40.3 | 39.6 | 40.7 | 32.0 | 34.7 |
| L* | 89.9 | 95.80 | 95.47 | 95.72 | 95.9 | 96.0 | 95.9 | 95.10 | 95.59 |
| a* | 1.29 | −1.90 | −1.73 | −1.80 | −1.88 | −1.91 | −1.8 | −1.85 | −1.80 |
| b* | 14.27 | 10.97 | 11.72 | 11.32 | 10.9 | 11.1 | 10.8 | 12.24 | 11.98 |
| Fe, mg/kg | <10 | | | | | | | | |
| Mn, mg/kg | 18 | | | | | | | | |
| Ca, mg/kg | 787 | | | | | | | | |
| Cu, mg/kg | <1 | | | | | | | | |
| Acidification: pH 4.5 | | * | * | * | * | * | * | * | * |

The results show that with less than 10 kg/tp of the composition according to the invention as good bleaching result as with silicate can be achieved. It can also be seen that even at a low dosage of the different stabilizers, the composition works better than the compositions according to the inventions WO 1 and WO 4. This in spite that extra PLAC had been added into the mixture according to WO 4 (Blend S06035). An addition of PLAC should have given an increased performance.

Example 5

Comparison of bleaching of a commercial sample of spruce-CTMP with and without silicate, bleaching according WO 1, WO 2 and WO 4 and the present invention. The experimental conditions and the results are set forth in Table 3.

TABLE 3

| Conditions/properties/ test number | reference pulp | # 2 | # 4 | # 3 | # 5 | A WO 1 | B WO 2 | C WO 4 | AC invention |
|---|---|---|---|---|---|---|---|---|---|
| T, °C. | | 78 | 78 | 78 | 78 | 78 | 78 | 78 | 78 |
| t, min | | 72 | 72 | 72 | 72 | 72 | 72 | 72 | 72 |
| Consistency % | | 12 | 12 | 12 | 12 | 12 | 12 | 12 | 12 |
| $H_2O_2$ (100%) kg/tp | | 22 | 22 | 22 | 22 | 22 | 22 | 22 | 22 |
| Silicate as product kg/tp | | | | 18.4 | 18.4 | | | | |
| Additive as product kg/tp | | | | | | 3 | 3 | 3 | 3 |
| NaOH(100%) kg/tp | | 15 | 13 | 15 | 13 | 13 | 13 | 13 | 13 |
| Initial pH | | 10.7 | 10.6 | 10.7 | 10.7 | 10.8 | 10.7 | 10.7 | 10.7 |
| Final pH | | 9.2 | 9.0 | 9.5 | 9.4 | 8.8 | 9.1 | 9.1 | 9.0 |
| Residual $H_2O_2$ kg/tp | | 4.3 | 5.5 | 9.5 | 9.8 | 6.3 | 7.9 | 6.7 | 11.1 |
| Residual NaOH kg/tp | | 0.6 | 0.4 | 2.4 | 1.8 | 0.4 | 0.4 | 0.5 | 0.5 |
| Brightness % ISO | 60.9 | 67.2 | 67.2 | 69.9 | 70.1 | 68.5 | 68.6 | 68.2 | 69.8 |
| Fe mg/kg | <10 | | | | | | | | |
| Mn, mg/kg | 24 | | | | | | | | |
| Ca, mg/kg | 824 | | | | | | | | |
| Mg, mg/kg | 40 | | | | | | | | |
| Cu, mg/kg | <1 | | | | | | | | |

| AC = Invention | As such | As solids | Basic ratio |
|---|---|---|---|
| Polymer (A) 50% | 10.60% | 5.30% | 1.00 |
| DTPA-5Na 50% (comp. B) | 11.00% | 5.50% | 1.00 |
| PLAC (compound C) | | 8.30% | 1.00 |
| MA:AA copolymer (D) 44% | 12.50% | 5.5% | 1.00 |

A = ratio of compounds as 100% (A):(B) = 1:1.67, total content as 100% = 13.4%

| A = WO 1 | As such | As solids | Ratio to invention |
|---|---|---|---|
| Polymer (A) 50% | 10.0% | 5.00% | 0.94 |
| DTPA-5Na 50% (comp. B) | 16.7% | 8.35% | 1.52 |

B ratio of compounds (A):(B):(E*) = 1:1.67:3.34, total content of (A) + (B) as 100% = 8%

| B = WO 2 | As such | As solids | Ratio to invention |
|---|---|---|---|
| Polymer (A) 50% | 12.0% | 6.0% | 1.13 |
| DTPA-5Na 50% (comp. B) | 20.0% | 10.0% | 1.82 |
| MgSO4*7H2O | 41.0% | 20.0% | as MgSO4 |
| Water | 27.0% | 64.0% | |
| Total | 100% | 100% | |

*(E) is MgSO4•7H2O

| C = WO 4 | As such | As solids | Ratio to invention |
|---|---|---|---|
| PLAC (compound C) | | 3.245% | 0.39 |
| MA:AA copolymer (D) | | 22.40% | 3.58 |

It can be seen that, if silicate is not used, the brightness will increase, but the residual peroxide will remain very low. Since the residual peroxide is normally wholly or partly recycled, a high residual peroxide content as well as high brightness as possible is wanted.

If silicate is used, the brightness will increase beyond the brightness, which can be achieved by using caustic soda alone. The residual peroxide is also increasing.

When the experiments were carried according to the inventions WO 1, WO 2 and WO 4, the brightness increase, but the residual peroxide remained lower than achievable with the use of silicate as a stabilizer The composition according to the invention gave good brightness and even higher residual peroxide than the bleaching with silicate. Since silicate contains say at least 10% free sodium hydroxide and acts as buffer, the residual hydroxide content is higher than when using the composition according to the invention.

Since residual peroxide is higher, one could have added more caustic soda to increase the hydroxide content and thus consume more peroxide and increase the brightness.

Example 6

The Effect of Dosages

The same composition AC (Invention) as in Example 5 was used in these experiments at various dosages. Test number 5 was the same as in Table 3. The experimental conditions and the results are set forth in Table 4.

TABLE 4

| Conditions/properties/ test number | According to invention | | | | | | |
|---|---|---|---|---|---|---|---|
| | # 19 | # 20 | # 6 | # 21 | # 22 | # 23 | # 5 |
| T, ° C. | 78 | 78 | 78 | | | | 78 |
| t, min | 72 | 72 | 72 | | | | 72 |
| Consistency % | 12 | 12 | 12 | | | | 12 |
| $H_2O_2$ (100%) kg/tp | 22 | 22 | 22 | | | | 22 |
| Silicate as product kg/tp | | | | | | | 18.4 |
| Additive as product kg/tp | 1 | 2 | 3 | 4 | 5 | 6 | |
| NaOH (100%) kg/tp | 13 | 13 | 13 | 13 | 13 | 13 | 13 |
| Initial pH | 10.8 | 10.8 | 10.7 | 10.9 | 10.8 | 10.8 | 10.7 |
| Final pH | 8.8 | 8.8 | 9.0 | 8.9 | 8.7 | 8.9 | 9.4 |
| Residual $H_2O_2$ kg/tp | 6.5 | 9.5 | 11.1 | 12.4 | 12.9 | 13.5 | 9.8 |
| Residual NaOH kg/tp | 0.3 | 0.3 | 0.5 | 0.4 | 0.4 | 0.4 | 1.8 |
| Brightness % ISO | 68.3 | 69.3 | 69.8 | 70.1 | 70.2 | 70.4 | 70.1 |

It can be seen that a dosage of 2 kg/tp of the composition gives good bleaching results measured as brightness and residual peroxide.

If the dosage is increased, the bleaching results will still improve, though no additional caustic soda, which could have improved the brightness results, have been added.

Example 7

The Effect of the Composition

In these experiments the effect of the composition of the stabilizers were tested. Spruce-CTMP was used in these experiments. The experimental conditions and the results are set forth in Table 5.

TABLE 5

| | Ratio (A = AHPS):(B = DTPA):(C = PHAS):(D = MA-AA) | | | | | | |
|---|---|---|---|---|---|---|---|
| Conditions/properties/ Blend number | 1:1:1:1 #6006 | 1/2:1:1:1 #6010 | 1/2:1:1:1/2 #6021 | 1/2:1/2:1:1 #6012 | 1:1/2:1:1/2 #6019 | 1/2:1/2:1:1/2 #6017 | 1/2:1:1:0 #6013 |
| T, ° C. | 78 | 78 | 78 | 78 | 78 | 78 | 78 |
| t, min | 72 | 72 | 72 | 72 | 72 | 72 | 72 |
| Consistency % | 12 | 12 | 12 | 12 | 12 | 12 | 12 |
| $H_2O_2$ (100%) kg/tp | 22 | 22 | 22 | 22 | 22 | 22 | 22 |
| Additive as product kg/tp | 3 | 3 | 3 | 3 | 3 | 3 | 3 |
| NaOH (100%) kg/tp | 13 | 13 | 13 | 13 | 13 | 13 | 13 |
| Initial pH | 10.6 | 10.7 | 10.5 | 10.6 | 10.4 | 10.5 | 10.8 |
| Final pH | 8.9 | 8.8 | 8.8 | 8.7 | 8.8 | 8.7 | 8.9 |
| Residual $H_2O_2$ kg/tp | 11.3 | 11.2 | 10.1 | 10.4 | 10.7 | 9.0 | 11.2 |
| Residual NaOH kg/tp | 0.4 | 0.4 | 0.4 | 0.4 | 0.4 | 0.5 | 0.4 |
| Brightness % ISO | 69.6 | 69.8 | 69.6 | 69.3 | 68.7 | 69.7 | 69.9 |

It has to be considered that all the experiments are made under laboratory conditions. E.g. the trials with the sample 1 (CTMP) in industrial scale revealed that only the composition according to the invention worked well. The same brightness and residual peroxide than with silicate, and much improved water removal. The products according to WO2 and WO4 failed totally, which could be seen in decreasing brightness and residual peroxide, when the silicate content in the circulating water started to decrease.

Example 8

Water Retention Value (WRV)

An industrial CTMP (spruce, *picea abies*) pulp taken from real process after HC-peroxide bleaching tower (before wash press) was used in the WRV tests. Way of stabilize peroxide in the HC peroxide bleaching was different in pulp samples: sodium silicate or stabilator C. WRV method was based on SCAN-C 62:00 standard. 6 g as dry pulp was weight, diluted to 2 liters with deionized water, and disintegrated 60 min 500 rpm before analysis according to the standard.

Blend AC releases water better than water glass. Water glass hold water 1.52 g/g and blend AC holds water 1.47 g/g.

The invention claimed is:

1. A stabilizing composition comprising the following components
(A) a polymer having the following formula

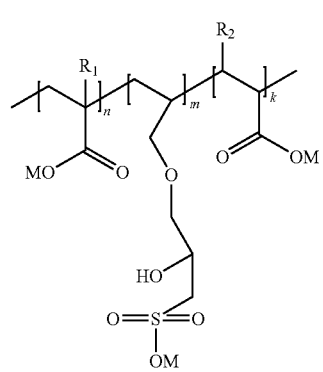

I wherein
$R_1$ is a hydrogen atom or an alkyl group containing 1 to 12 carbon atoms,
$R_2$ is —COOM or —$CH_2$COOM,
M is a hydrogen atom, an alkali metal ion, an alkaline earth metal ion, an ammonium ion or a mixture thereof,
n, m and k are molar ratios of corresponding monomers, wherein n is 0 to 0.95, m is 0.05 to 0.9, and k is 0 to 0.8, and (n+m+k) equals 1, and
the weight average molecular weight is between 500 and 20,000,000 g/mol,
(B) a chelating agent,
(C) a poly-alpha-hydroxyacrylic acid or an alkaline salt thereof or the corresponding polylactone thereof, and
(D) optionally a polycarboxylic acid polymer or an alkaline salt thereof, wherein the components (A), (B) and (C) are present in following weight ratios 0.1 to 1:0.1 to 1:1, calculated as active substance.

2. The composition according to claim 1 wherein in formula I n is 0.4 to 0.9, m is 0.1 to 0.5, and k is 0 to 0.5.

3. The composition according to claim 1 wherein the weight average molecular weight of the (A) copolymer is between 1,000 and 1,000,000 g/mol.

4. The composition according to claim 1 wherein polymer (A) is a copolymer of 3-allyloxy-2-hydroxypropanesulfonic acid and at least one of the monomers acrylic acid, methacrylic acid, maleic acid and itaconic acid or a salt thereof.

5. The composition according to claim 1 wherein the chelating agent is a compound having the following general formula

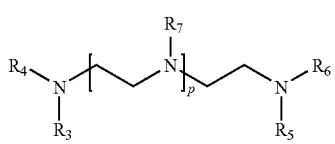

II wherein p is 0 or an integer of 1 to 10, $R_3$, $R_4$, $R_5$, $R_6$ and $R_7$ are independently a hydrogen atom or an alkyl chain having 1 to 6 carbon atoms and containing one or more active chelating ligands, such as carboxylic, phosphonic or hydroxyl group(s) or a salt thereof.

6. The composition according to claim 1 wherein the chelating agent is a compound having the following general formula

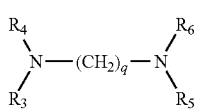

III wherein q is an integer of 3 to 10, $R_3$, $R_4$, $R_5$ and $R_6$ are independently a hydrogen atom or an alkyl chain having 1 to 6 carbon atoms and containing one or more active chelating ligands, such as carboxylic, phosphonic or hydroxyl group(s) or a salt thereof.

7. The composition according to claim 1 wherein the chelating agent is a compound having the following general formula

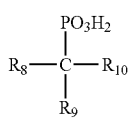

IV wherein $R_8$ is a hydrogen atom, an alkyl group containing 1 to 6 carbon atoms or an alkyl chain having 1 to 6 carbon atoms and containing a carboxylic, phosphonic or hydroxyl group, $R_9$ is a hydrogen atom, hydroxyl group, phosphonic group, carboxylic group or alkyl chain having 1 to 6 carbon atoms and containing one or two carboxylic groups, and $R_{10}$ is a hydrogen atom, hydroxyl group, carboxylic group, alkyl group containing 1 to 6 carbon atoms or alkyl chain having 1 to 6 carbon atoms and containing a carboxylic group, or a salt thereof.

8. The composition according to claim 1 wherein the chelating agent is a compound having the following general formula

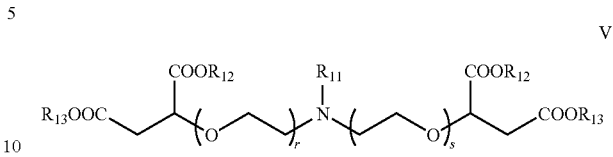

V wherein $R_{11}$ is a hydrogen atom an alkyl chain containing 1-30 carbon atoms, an alkyl chain containing 1-30 carbon atoms and 1-10 carboxylic acid groups attached to said chain, or alkali or alkaline earth metal salt thereof, an alkyl chain containing 1-30 carbon atoms and 1-10 carboxylic acid esters attached to said chain, a (poly)ethoxylated hydrocarbon chain containing 1-20 ethoxyl groups, or a carboxylic acid amide containing 1-30 carbon atoms, where N—$R_{11}$ bond is an amide bond, $R_{12}$ and $R_{13}$ are: hydrogen, an alkali metal ion or an alkaline earth metal ion or an alkyl group containing 1-30 carbon atoms, r is 0 or 1, and s is 0 or 1.

9. The composition according to claim 1 wherein the composition comprises component (D) which comprises a homopolymer of acrylic acid or methacrylic acid or a copolymer of (meth)acrylic and another unsaturated carboxylic or dicarboxylic acid.

10. The composition according to claim 1 wherein the components (A), (B), (C) and (D) are present in following weight ratios 0.1 to 1:0.1 to 1:1:0.1 to 1, calculated as active substance.

11. A process for the treatment of a fiber material comprising the step of contacting the fiber material in an aqueous medium with following components (A) a polymer having the following general formula

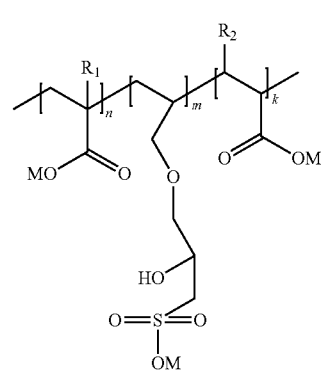

I wherein $R_1$ is a hydrogen atom or an alkyl group containing 1 to 12 carbon atoms, $R_2$ is —COOM or —CH$_2$COOM, M is a hydrogen atom, an alkali metal ion, an alkaline earth metal ion, an ammonium ion or a mixture thereof, n, m and k are molar ratios of corresponding monomers, wherein n is 0 to 0.95, m is 0.05 to 0.9, and k is 0 to 0.8, and (n+m+k) equals 1, and the weight average molecular weight is between 500 and 20,000,000 g/mol, (B) a chelating agent, (C) a poly-alpha-hydroxyacrylic acid or an alkaline salt thereof or the corresponding polylactone thereof, (D) optionally a polycarboxylic acid polymer or an alkaline salt thereof, wherein the fiber material is a cellulosic fiber material comprising a mechanical or chemi-mechanical pulp or a recycled fiber material, and wherein the components (A), (B) and (C) are present in following weight ratios 0.1 to 1:0.1 to 1:1, calculated as active substance.

12. The process according to claim 11 wherein the components (A), (B) and (C), and optionally the component (D) are introduced as a mixture or the components (A), (B) and (C), and optionally the component (D) are introduced separately.

13. The process according to claim 11 wherein the treatment comprises bleaching the fiber material with an alkaline peroxide solution in the presence of the components (A), (B) and (C), and optionally the component (D).

14. The process according to claim 13 wherein the pH of the alkaline peroxide solution is between 7 and 13.

15. The process according to claim 13 wherein the bleaching is preceded by a treatment with a chelating agent.

16. The process according to claim 11 wherein the fiber material comprises a recycled fiber material, and wherein the treatment comprises de-inking the recycled fiber material in the aqueous medium comprising the components (A), (B) and (C), and optionally the component (D).

17. The process according to claim 11 wherein in formula I n is 0.4 to 0.9, m is 0.1 to 0.5, and k is 0 to 0.5.

18. The process according to claim 11 wherein the weight average molecular weight of the copolymer (A) is between 1,000 and 1,000,000 g/mol.

19. The process according to claim 11 wherein the polymer (A) is a copolymer of 3-allyloxy-2-hydroxypropanesulfonic acid and at least one of the monomers acrylic acid, methacrylic acid, maleic acid and itaconic acid or a salt thereof.

20. The process according to claim 11 wherein the chelating agent (B) is as defined in any of claims 6 to 9.

21. The process according to claim 11 wherein component (D) is present and comprises a homopolymer of acrylic acid or methacrylic acid or a copolymer of (meth)acrylic and another unsaturated carboxylic or dicarboxylic acid.

22. The process according to claim 11 wherein the components (A), (B), (C) and (D) are present in following weight ratios 0.1 to 1:0.1 to 1:1:0.1 to 1, calculated as active substance.

23. The process according to claim 11 wherein the total amount of the components (A), (B) and (C), and optionally the component (D) in the treatment is 2 to 10 kg per ton of dry fiber material.

* * * * *